United States Patent
Xu et al.

(10) Patent No.: US 11,183,128 B2
(45) Date of Patent: Nov. 23, 2021

(54) LIQUID CRYSTAL DISPLAY AND DISPLAY CALIBRATION METHOD THEREOF

(71) Applicant: Wistron Corporation, New Taipei (TW)

(72) Inventors: Yueqi Xu, New Taipei (TW);
Chih-Chou Chou, New Taipei (TW);
Junxin Qiu, New Taipei (TW);
Yongqiang Li, New Taipei (TW);
Wenzhi Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/866,553

(22) Filed: May 5, 2020

(65) Prior Publication Data
US 2021/0272526 A1 Sep. 2, 2021

(30) Foreign Application Priority Data
Feb. 28, 2020 (CN) .......................... 202010131136.1

(51) Int. Cl.
*G09G 3/36* (2006.01)
*G09G 3/34* (2006.01)
(Continued)

(52) U.S. Cl.
CPC ........... *G09G 3/342* (2013.01); *G02F 1/1345* (2013.01); *G02F 1/133603* (2013.01);
(Continued)

(58) Field of Classification Search
CPC ............ G09G 3/36; G09G 3/34; G09G 3/342; G09G 2320/0252; G09G 2320/064; G09G 2320/0693; G02F 1/13
See application file for complete search history.

(56) References Cited

U.S. PATENT DOCUMENTS 8,451,211 B2 5/2013 Yu
2005/0083353 A1* 4/2005 Maruyama ........... G09G 3/3611
345/690

(Continued)

FOREIGN PATENT DOCUMENTS

TW M373544 2/2010
TW 201125363 7/2011

OTHER PUBLICATIONS

"Office Action of Taiwan Counterpart Application", dated Feb. 26, 2021, p. 1-p. 8.
(Continued)

*Primary Examiner* — Pegeman Karimi
(74) *Attorney, Agent, or Firm* — JCIPRNET

(57) ABSTRACT

A liquid crystal display and a display calibration method thereof are provided. The display calibration method includes the following steps. A liquid crystal display panel is driven by a driving circuit to display an image. A light-emitting diode backlight module is driven by the driving circuit to provide a backlight to the liquid crystal display panel, wherein the driving circuit determines at least one illuminating time of the light-emitting diode backlight module according to a response time of the liquid crystal display panel and a writing period of at least one target display area of the liquid crystal display panel.

16 Claims, 5 Drawing Sheets

(51) Int. Cl.
*G02F 1/13357* (2006.01)
*G02F 1/1345* (2006.01)
*G02F 1/1335* (2006.01)

(52) U.S. Cl.
CPC ......... *G09G 3/36* (2013.01); *G02F 1/133601* (2021.01); *G09G 2320/0252* (2013.01); *G09G 2320/0257* (2013.01); *G09G 2320/064* (2013.01); *G09G 2320/0693* (2013.01)

(56) References Cited

U.S. PATENT DOCUMENTS

| | | | |
|---|---|---|---|
| 2009/0243993 A1* | 10/2009 | Kuga | G02F 1/13318 345/102 |
| 2011/0157111 A1 | 6/2011 | Lee et al. | |
| 2011/0169852 A1 | 7/2011 | Yu | |
| 2014/0198123 A1* | 7/2014 | Shibamiya | G09G 3/3426 345/589 |
| 2017/0249906 A1* | 8/2017 | Noh | G09G 3/3266 |
| 2019/0295477 A1* | 9/2019 | Tada | G09G 3/342 |
| 2020/0135074 A1* | 4/2020 | Wooster | G09G 3/342 |

OTHER PUBLICATIONS

"Office Action of US Related U.S. Appl. No. 17/160,413", dated Aug. 2, 2021, pp. 1-27.

* cited by examiner

LIQUID CRYSTAL DISPLAY AND DISPLAY CALIBRATION METHOD THEREOF

CROSS-REFERENCE TO RELATED APPLICATION

This application claims the priority benefit of China application serial no. 202010131136.1, filed on Feb. 28, 2020. The entirety of the above-mentioned patent application is hereby incorporated by reference herein and made a part of this specification.

BACKGROUND

Technical Field

The disclosure relates to a display device, and more particularly to a liquid crystal display and a display calibration method thereof.

Description of Related Art

At present, video games are all over the world and as more and more people enjoy participating in video games, the demand for eSports displays increases, wherein the three most important parameters of eSports displays are: screen update rate, response time, and color display effect. Conventional display panels are mainly divided into three types: twisted nematic (TN) type, in-plane-switching (IPS) type, and vertical alignment (VA) type. TN display panels have a relatively higher market share in eSports displays due to the fastest response time, but colors are not bright enough and viewing angles are poor. IPS display panels and VA display panels have good colors and large viewing angles, but their response times are flawed, that is, longer response times will generate afterimages. Therefore, a new display method is required to eliminate the afterimages, so as to ensure that the images seen are the clearest.

SUMMARY

The disclosure provides a liquid crystal display and a display calibration method thereof, which can eliminate afterimages caused by slow deflection of liquid crystal, so as to ensure the clarity of the screen.

The liquid crystal display according to the disclosure includes a liquid crystal display (LCD) panel, a light-emitting diode (LED) backlight module, and a driving circuit. The driving circuit is coupled to the LCD panel and the LED backlight module, and is configured to drive the LCD panel to display an image and drive the LED backlight module to provide a backlight to the LCD panel, wherein the driving circuit determines at least one illuminating time of the LED backlight module according to a response time of the LCD panel and a writing period of at least one target display area of the LCD panel.

The display calibration method of the LCD according to the disclosure includes the following steps. An LCD panel is driven by a driving circuit to display an image. An LED backlight module is driven by the driving circuit to provide a backlight to the LCD panel, wherein the driving circuit determines at least one illuminating time of the LED backlight module according to a response time of the LCD panel and a writing period of at least one target display area of the LCD panel.

Based on the above, the LCD and the display calibration method thereof according to the disclosure determine at least one illuminating time of the LED backlight module according to the response time of the LCD panel and the writing period of the at least one target display area of the LCD panel. In this way, the afterimages caused by the slow deflection of liquid crystal can be eliminated, so that the images seen by the user are the clearest.

To make the aforementioned and other features of the disclosure more comprehensible, several embodiments accompanied with drawings are described in detail as follows.

DETAILED DESCRIPTION OF DISCLOSED EMBODIMENTS

Figure 1:
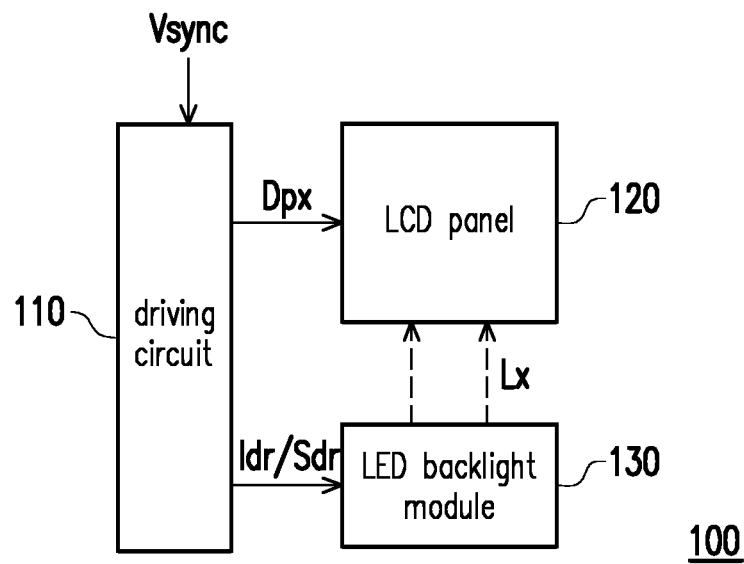
FIG. 1 is a schematic view of a system of a liquid crystal display (LCD) according to an embodiment of the disclosure.

FIG. 1 is a schematic view of a system of a liquid crystal display (LCD) according to an embodiment of the disclosure. Please refer to FIG. 1. In the embodiment, an LCD 100 includes a driving circuit 110, an LCD panel 120, and a light-emitting diode (LED) backlight module 130. The driving circuit 110 is coupled to the LCD panel 120 and the LED backlight module 130. The LED backlight module 130 is a global dimming backlight module, that is, the entire LED backlight module 130 cannot be switched on and off by partition, but the embodiment of the disclosure is not limited thereto. In addition, the LCD panel 120 may be an in-plane-switching (IPS) type and a vertical alignment (VA) type.

The driving circuit 110 receives a vertical synchronization signal Vsync and correspondingly provides a pixel data Dpx to the LCD panel 120, so as to drive the LCD panel 120 to display an image. In addition, the driving circuit 110 receives the vertical synchronization signal Vsync and correspondingly provides a driving signal Sdr and/or a driving current Idr to the LED backlight module 130, so as to drive the LED backlight module 130 to provide a backlight Lx to the LCD panel 120. The vertical synchronization signal Vsync is configured to define each screen period, that is, to define the start and end of each screen period.

The driving circuit 110 controls an illuminating time of the backlight Lx of the LED backlight module 130 to eliminate the afterimage issue caused by a relatively slower response time of the LCD panel 120. In the embodiment of the disclosure, the driving circuit 110 may at least include a timing controller, a gate driver, and a source driver, but the embodiment of the disclosure is not limited thereto.

In the embodiment, the high-frequency square wave (i.e., the driving signal Sdr) of the driving circuit 110 is used to control driving the LED backlight module 130 to be switched on and off, that is, to control the illuminating time of the LED backlight module 130. The method reduces the time for driving the LED backlight module 130 to be switched on and also reduces the portion of the screen displayed during the deflection of liquid crystal of the LCD panel 120, so the screen effect is better. In addition, the overall brightness loss caused by using the square wave for driving can be compensated by adjusting the illuminating time of the LED backlight module 130.

Figure 2:
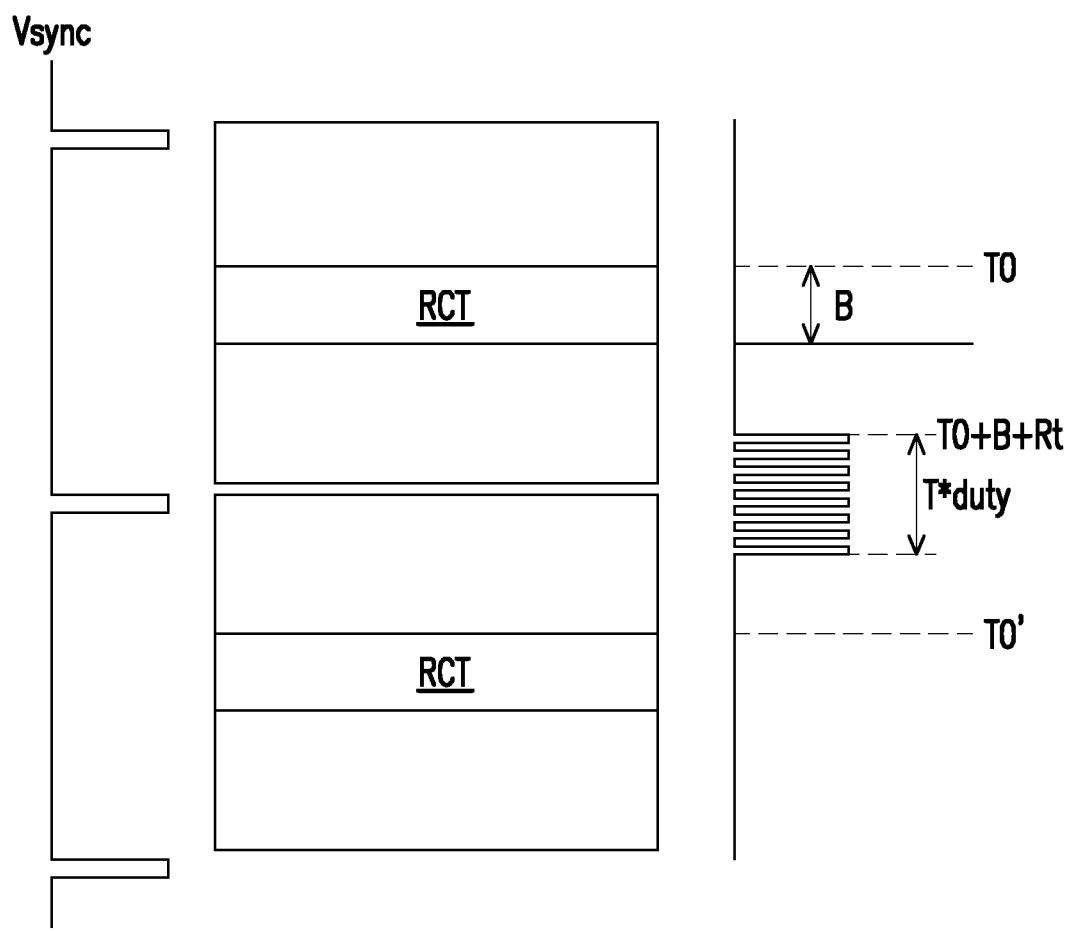
FIG. 2 is a schematic view of driving a light-emitting diode (LED) backlight module according to an embodiment of the disclosure.

FIG. 2 is a schematic view of driving an LED backlight module according to an embodiment of the disclosure. Please refer to FIG. 1 and FIG. 2. In the embodiment, the driving circuit 110 determines an illuminating time T*duty (i.e., the duration of the square wave) of the LED backlight module 130 according to a response time Rt of the LCD panel 120 and a writing period B of a target display area of the LCD panel 120. For example, the driving circuit 110 determines the illuminating time T*duty of the LED backlight module 130 according to the response time Rt of the LCD panel 120 and the writing period B of a central display area RCT as the target display area of the LCD panel 120.

First, in order to ensure the best display effect of the central display area RCT of the LCD panel 120, it is assumed that T0 is the time for starting to update the screen of the central display area RCT, B is the time for updating the screen of the complete central display area RCT, and together with the response time Rt required for the deflection of liquid crystal of the display panel 120, it can be obtained that the time for switching on the LED backlight module 130 is T0+B+Rt. If it is finally calculated that T0+B+Rt>T, it means that the time for switching on the LED backlight module 130 in the next screen period of the LCD panel 120 is T0+B+Rt−T. However, the illuminating time of the LED backlight module 130 is T*duty and the backlight must be switched off before the central display area RCT is updated again, that is, before a time T0', so the central display area RCT and the illuminating time T*duty of the LED backlight module 130 have the following relationship:

$$T0+B+Rt+T*\text{duty}=T0+T.$$

It can be known from the above equation that the smaller the response time Rt and the smaller the illuminating time T*duty, the larger the range of the central display area RCT obtained, that is, the size of the central display area RCT is inversely proportional to the sum of the response time Rt of the LCD panel 120 and the illuminating time T*duty of the LED backlight module 130. However, continuously reducing the response time Rt and the illuminating time T*duty will cause the distortion of screen color and the loss of brightness. Therefore, the best picture effect must prevail to obtain a balance between the values.

In other words, when the brightness of the LED backlight module 130 is greater than or equal to a specified brightness (or an expected brightness), the central display area RCT and the response time Rt may not be adjusted; and when the brightness of the LED backlight module 130 is less than the specified brightness, the size of the central display area RCT may be reduced to increase the illuminating time T*duty of the LED backlight module 130.

In the embodiment of the disclosure, when the brightness of the LED backlight module 130 is less than the specified brightness, the driving current Idr of the LED backlight module 130 may be increased. That is, when the brightness of the LED backlight module 130 is insufficient, the illuminating time T*duty of the LED backlight module 130 may be increased by reducing the size of the central display area RCT and/or increasing the driving current Idr.

For example, the driving circuit 110 may enable the response time Rt of the LCD panel 120 to reach an acceptable range of the screen effect by a driving technology (such as an overdrive technology), that is, the response time Rt of the LCD panel 120 may be less than a time T for updating a screen. Assuming that the current update rate of the LCD panel 120 is 144 Hz, the time for updating the screen is about 6.9 ms. Also, the original response time Rt of the LCD panel 120 is 14 ms, which may be reduced to about 5 ms by the driving technology. The duty is set to 10% in the minimum brightness specification, by substituting the values into the equation T0+B+Rt+T*duty=T0+T, it can be obtained that B=6.9−5−0.69=1.21 ms. Since it must be ensured that the effect of the central display area RCT is clear, T0=T/2−B/2≈2.8 ms.

Figure 3:
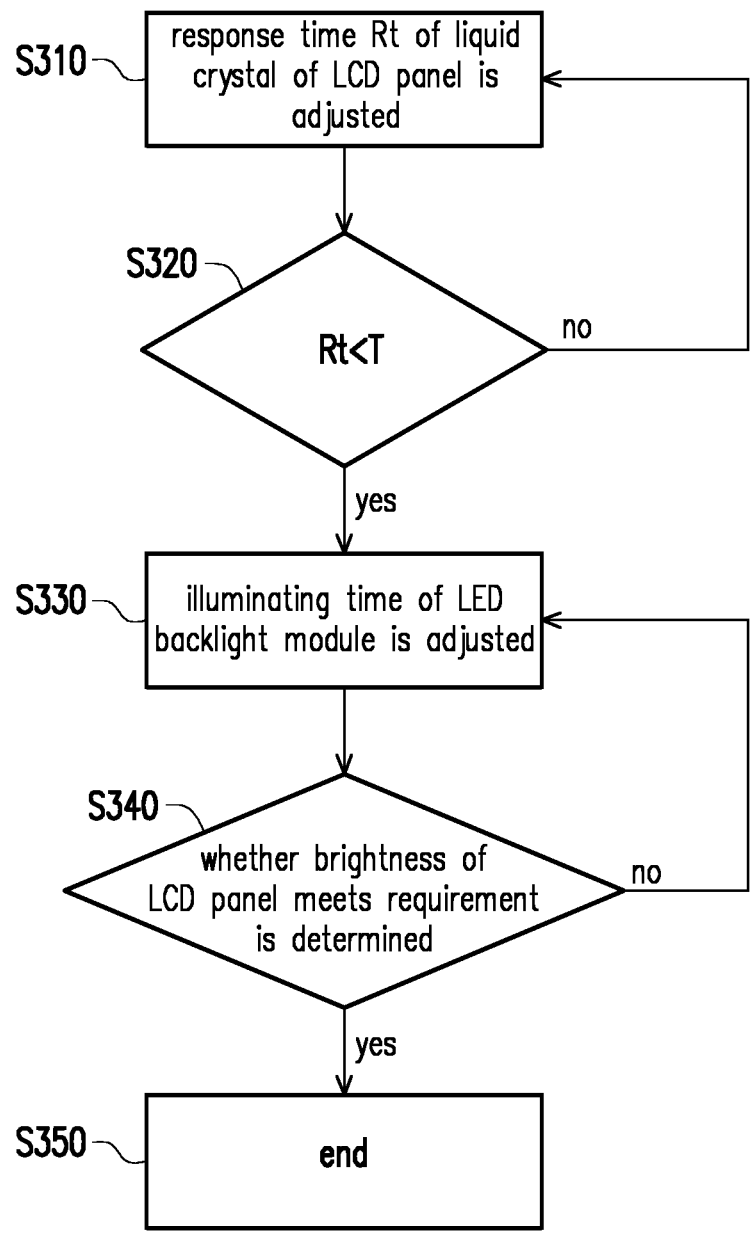
FIG. 3 is a flowchart of a display calibration method of an LCD according to an embodiment of the disclosure.

FIG. 3 is a flowchart of a display calibration method of an LCD according to an embodiment of the disclosure. Please refer to FIG. 1 to FIG. 3. In the embodiment, the display calibration method of the LCD includes at least the following steps. In Step S310, a response time Rt of liquid crystal of the LCD panel may be adjusted by a driving technology. In Step S320, it is determined whether the response time Rt of liquid crystal is less than a time T for updating a screen. When the response time Rt of liquid crystal is greater than or equal to the time T for updating the screen, that is, a determination result of Step S320 is "no", the process returns to Step S310; and when the response time Rt of liquid crystal is less than the time T for updating the screen, that is, the determination result of Step S320 is "yes", Step S330 is performed.

In Step S330, an illuminating time T*duty of the LED backlight module 130 is adjusted according to the response time Rt of the LCD panel 120 and a writing period B of a target display area of the LCD panel 120.

In Step S340, it is determined whether the brightness of the LCD panel 120 meets the requirement (i.e., the specified brightness). When the brightness of the LCD panel 120 does not meet the requirement, that is, the determination result of Step S340 is "no", the process returns to Step S330; and when the brightness of the LCD panel 120 meets the requirement, that is, the determination result of Step S340 is "yes", Step S350 is performed to end the display calibration method.

The sequence of Steps S310, S320, S330, S340, and S350 is for illustrative purpose, and the embodiment of the disclosure is not limited thereto. In addition, please refer to the embodiments shown in FIG. 1 and FIG. 2 for details of Steps S310, S320, S330, S340, and S350, which will not be reiterated here.

Figure 4:
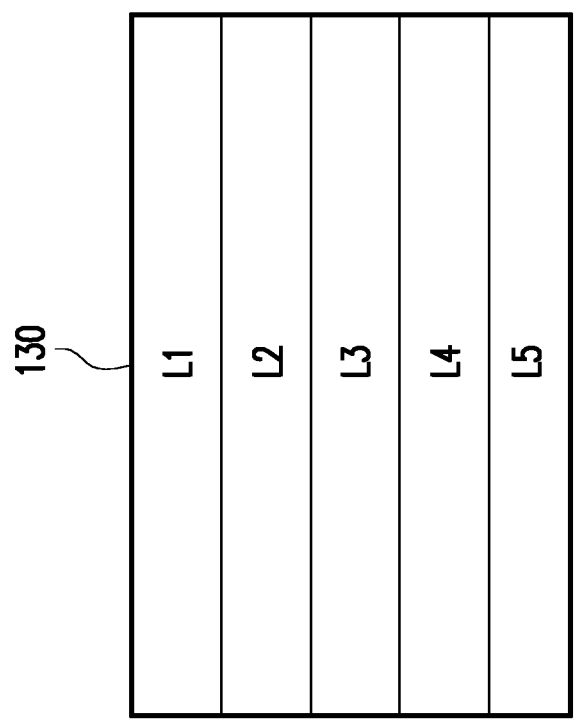
FIG. 4 is a schematic view of partitioning an LED backlight module according to an embodiment of the disclosure.

FIG. 4 is a schematic view of partitioning an LED backlight module according to an embodiment of the disclosure. Please refer to FIG. 1 and FIG. 4. In the embodiment, the LED backlight module 130 is, for example, a local dimming backlight module, that is, the LED backlight module 130 may be divided into multiple illuminating blocks L1 to L5 and the LCD panel 120 is also correspondingly divided into multiple target display areas, wherein the illuminating blocks L1 to L5 each includes at least one LED illuminating strip.

Assuming that the LCD panel 120 is scanned from top to bottom and liquid crystal starts to flip after scanning. When liquid crystal in the target display area corresponding to the illuminating block L1 is completely flipped, a high-frequency square wave is loaded and the backlight of the illuminating block L1 is lit up; and when liquid crystal in the target display area corresponding to the illuminating block L2 is deflected, the backlight of the illuminating block L2 is lit up. As such, the backlights of the illuminating blocks L1 to L5 are lit up one by one to eliminate the afterimages caused by the slow deflection of liquid crystal, so that the screens seen by the user are all the clearest.

In other words, the driving circuit 110 may individually determine the illuminating time of the corresponding one in the multiple illuminating blocks L1 to L5 of the LED backlight module 130 according to the response time of the LCD panel 120 and the multiple writing periods of the multiple target display areas of the LCD panel 120.

Figure 5:
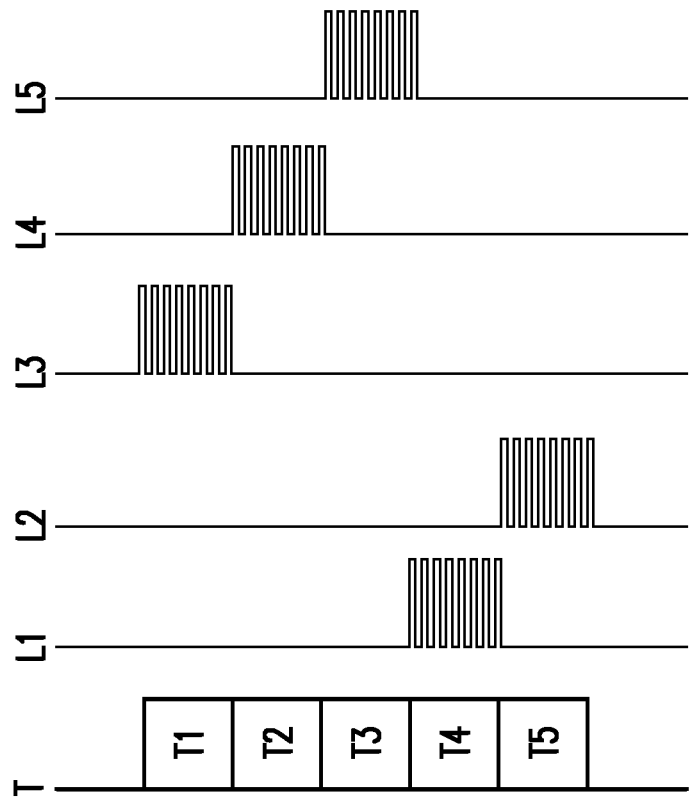
FIG. 5 is a schematic diagram of driving an LED backlight module according to another embodiment of the disclosure.

FIG. 5 is a schematic diagram of driving an LED backlight module according to another embodiment of the disclosure. Please refer to FIG. 1, FIG. 4, and FIG. 5. In the embodiment, in the case where the LCD panel 120 is scanned from top to bottom, the target display area corresponding to the illuminating block L1 completely updates the screen at a time T1 and the illuminating block L1 will be switched on at a time T4 after the corresponding liquid crystal is completely flipped; and the target display area corresponding to the illuminating block L2 completely updates the screen at a time T2 and the illuminating block L2 is switched on at a time l5 after the corresponding liquid crystal is completely flipped. Please refer to the above for the times for switching on the illuminating blocks L3 to L5, but the times for switching on the illuminating blocks L3 to L5 will be in the next screen period.

According to the above, the driving circuit 110 may first calculate the number of partition (that is, the target display area of the LCD panel 120). It can be first assumed that the number of partition is N, the response time of the LCD panel 120 is Rt, the time for updating the screen is T, the time for switching on the LED backlight module 130 is T*duty, the time for completely scanning each partition is T/N ms, the time of each illuminating block (i.e., L1 to L5) between the screen starts to update and is switched on is (T/N+Rt) ms, and the time of each illuminating block L1 to L5 being continuously switched on is ((T*duty)/N) ms. To ensure that the screens seen by the user are the clearest, the corresponding illuminating block L1 to L5 should be switched off before the next screen scans the corresponding target display area, so T/N+Rt+(T*duty)/N<T, and the result is derived as follows:

$$N>(T+T*\text{duty})/(T-Rt),$$

where N is a positive integer. After confirming the values of T, Rt, and duty, the smallest number of partition N may be calculated from the above equation. Once the number of partition N is confirmed, the time for switching on each illuminating block (i.e., L1 to L5) is confirmed to be an integer multiple of T/N. Assuming that the $x^{th}$ target display area is updated and the time for starting to update is $(x-1)*T/N$, then a time Ton (i.e., the time for turning on the $x^{th}$ illuminating block) for completely deflecting liquid crystal of the $x^{th}$ target display area is:

$$Ton=(x-1)*T/N+T/N+Rt,$$

if Ton is greater than T, it means that the backlight of the $x^{th}$ illuminating block is switched on at time Ton-T in the next screen update.

For example, the driving circuit 110 may enable the response time Rt of the LCD panel 120 to reach an acceptable range of the screen effect by a driving technology, that is, the response time Rt of the LCD panel 120 may be less than the time T for updating the screen. Assuming that the current update rate of the LCD panel 120 is 144 Hz, the time for updating the screen is about 6.9 ms. Also, the original response time Rt of the LCD panel 120 is 14 ms, which may be reduced to about 5 ms. The duty is set to 30% in the minimum brightness specification, by substituting the values into N>(T+T*duty)/(T-Rt), it can be obtained that the minimum value of N is 5. If a screen always starts to update in a first target display area, then the time for switching on a first illuminating block is Ton=(x-1)*T/N+T/N+Rt=6.38 ms.

Figure 6:
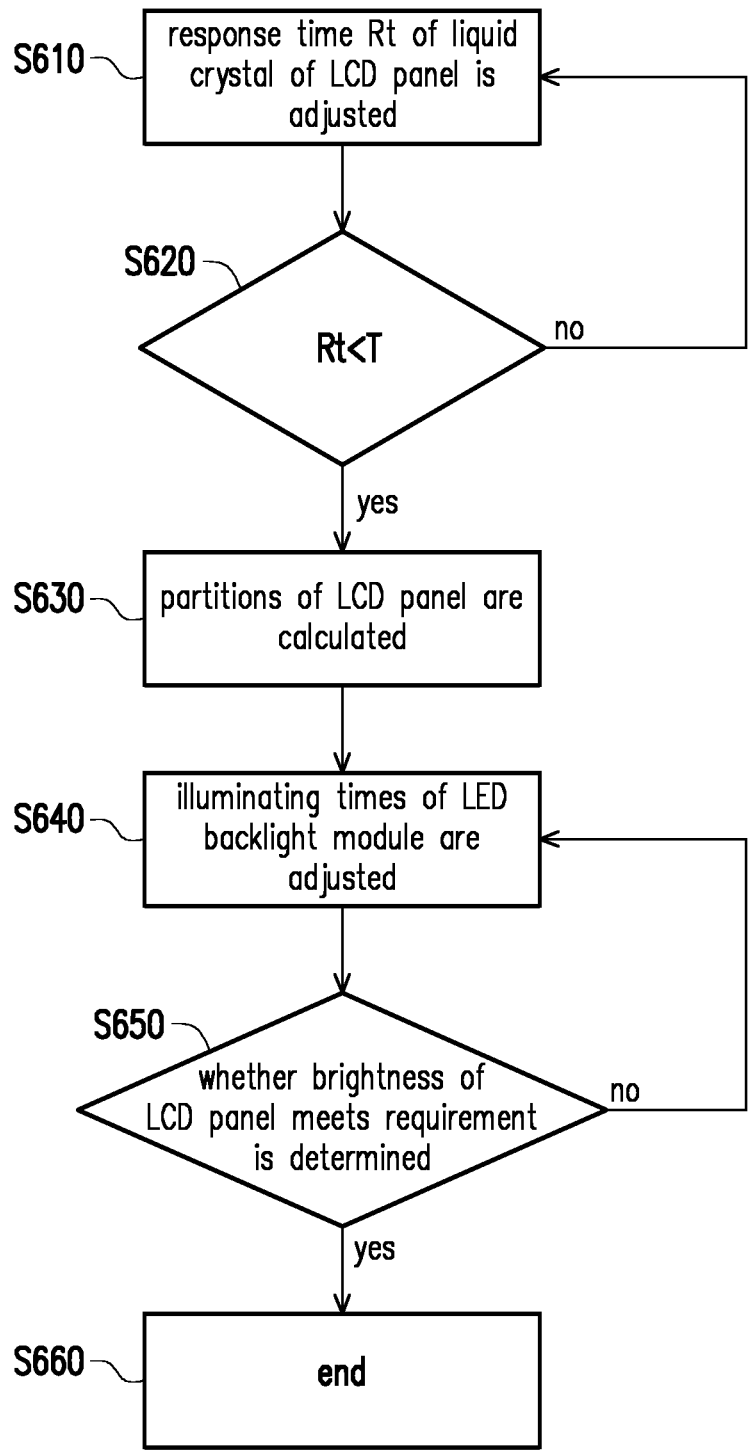
FIG. 6 is a flowchart of a display calibration method of an LCD according to another embodiment of the disclosure.

FIG. 6 is a flowchart of a display calibration method of an LCD according to another embodiment of the disclosure. Please refer to FIG. 1 and FIG. 4 to FIG. 6. In the embodiment, the display calibration method of the LCD at least includes the following steps. In Step S610, a response time Rt of liquid crystal of an LCD panel may be adjusted by a driving technology. In Step S620, it is determined whether the response time Rt of liquid crystal is less than a time T for updating a screen. When the response time Rt of liquid crystal is greater than or equal to the time T for updating the screen, that is, a determination result of Step S620 is "no", the process returns to Step S610; and when the response time Rt of liquid crystal is less than the time T for updating the screen, that is, the determination result of Step S620 is "yes", Step S630 is performed.

In Step S630, partitions of the LCD panel 120 are calculated. In Step S640, illuminating times of multiple illuminating areas of the LED backlight module 130 are adjusted according to the response time Rt of the LCD panel 120 and writing periods of multiple target display areas of the LCD panel 120.

In Step S650, it is determined whether the brightness of the LCD panel 120 meets the requirement (that is, the specified brightness). When the brightness of the LCD panel 120 does not meet the requirement, that is, the determination result of Step S650 is "no", the process returns to Step S640; and when the brightness of the LCD panel 120 meets the requirement, that is, the determination result of Step S650 is "yes", Step S660 is performed to end the display calibration method.

The sequence of Steps S610, S620, S630, S640, S650, and S660 is for illustrative purpose, and the embodiment of the disclosure is not limited thereto. In addition, please refer to the embodiments shown in FIG. 1, FIG. 4, and FIG. 5 for details of Steps S610, S620, S630, S640, S650, and S660, which will not be reiterated here.

Figure 7:
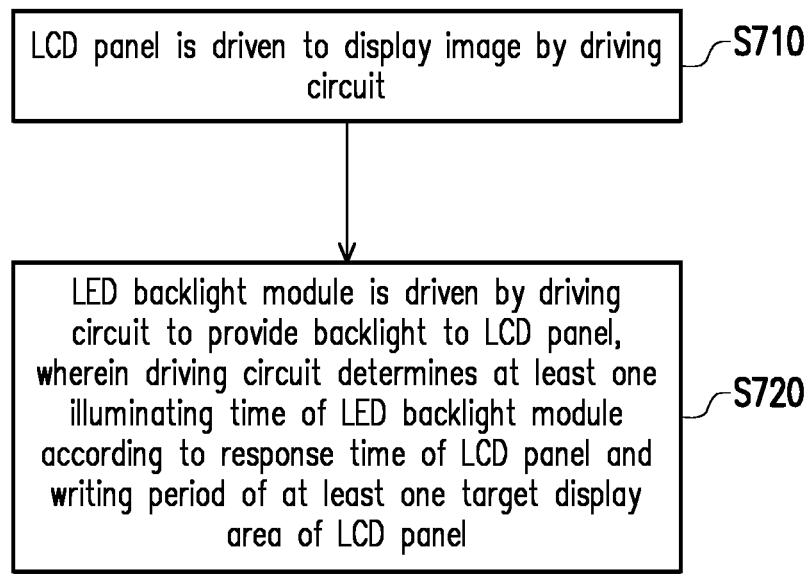
FIG. 7 is a flowchart of a display calibration method of an LCD according to yet another embodiment of the disclosure.

FIG. 7 is a flowchart of a display calibration method of an LCD according to yet another embodiment of the disclosure. Please refer to FIG. 7. In the embodiment, the display calibration method of the LCD includes at least the following steps. In Step S710, an LCD panel is driven to display an image by a driving circuit. In Step S720, an LED backlight module is driven by the driving circuit to provide a backlight to the LCD panel, wherein the driving circuit determines at least one illuminating time of the LED backlight module according to a response time of the LCD panel and a writing period of at least one target display area of the LCD panel. The sequence of Steps S710 and S720 is for illustrative purpose, and the embodiment of the disclosure is not limited thereto. In addition, please refer to the embodiments shown in FIG. 1 to FIG. 6 for details of Steps S710 and S720, which will not be reiterated here.

In summary, the LCD and the display calibration method thereof according to the disclosure determine at least one illuminating time of the LED backlight module according to the response time of the LCD panel and the writing period of the at least one target display area of the LCD panel. In this way, the afterimages caused by the slow deflection of liquid crystal can be eliminated, so that the images seen by the user are the clearest.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A liquid crystal display, comprising:
a liquid crystal display panel;
a light-emitting diode backlight module; and
a driving circuit, coupled to the liquid crystal display panel and the light-emitting diode backlight module, and configured to drive the liquid crystal display panel to display an image and drive the light-emitting diode backlight module to provide a backlight to the liquid crystal display panel, wherein the driving circuit determines at least one illuminating time of the light-emitting diode backlight module according to a response time of the liquid crystal display panel and a writing period of at least one target display area of the liquid crystal display panel,
wherein the driving circuit uses both the response time of the liquid crystal display panel and a writing period of a central display area as the target display area of the liquid crystal display panel to determine an illuminating time of the light-emitting diode backlight module.

2. The liquid crystal display according to claim 1, wherein the light-emitting diode backlight module is a global dimming backlight module.

3. The liquid crystal display according to claim 2, wherein when a brightness of the light-emitting diode backlight module is less than a specified brightness, a driving current of the light-emitting diode backlight module is increased.

4. The liquid crystal display according to claim 1, wherein a size of the central display area is inversely proportional to a sum of the response time of the liquid crystal display panel and the illuminating time of the light-emitting diode backlight module.

5. The liquid crystal display according to claim 4, wherein when a brightness of the light-emitting diode backlight module is less than a specified brightness, a size of the central display area is reduced to increase the illuminating time of the light-emitting diode backlight module.

6. The liquid crystal display according to claim 1, wherein the light-emitting diode backlight module is a local dimming backlight module.

7. The liquid crystal display according to claim 6, wherein the driving circuit individually determines an illuminating time of a corresponding one in a plurality of illuminating blocks of the light-emitting diode backlight module according to the response time of the liquid crystal display panel and a plurality of writing periods of a plurality of target display areas of the liquid crystal display panel.

8. The liquid crystal display according to claim 1, wherein the driving circuit enables the response time of the liquid crystal display panel to be less than a screen period by an overdrive technology.

9. The liquid crystal display according to claim 1, wherein a driving signal received by the light-emitting diode backlight module is a square signal.

10. A display calibration method of a liquid crystal display, comprising:
driving a liquid crystal display panel by a driving circuit to display an image; and
driving a light-emitting diode backlight module by the driving circuit to provide a backlight to the liquid crystal display panel, wherein the driving circuit determines at least one illuminating time of the light-emitting diode backlight module according to a response time of the liquid crystal display panel and a writing period of at least one target display area of the liquid crystal display panel,
wherein the step of determining at least one illuminating time of the light-emitting diode backlight module comprises:
using both the response time of the liquid crystal display panel and a writing period of a central display area as the target display area of the liquid crystal display panel to determine an illuminating time of the light-emitting diode backlight module.

11. The display calibration method according to claim 10, wherein the light-emitting diode backlight module is a global dimming backlight module.

12. The display calibration method according to claim 10, wherein a size of the central display area is inversely proportional to a sum of the response time of the liquid crystal display panel and the illuminating time of the light-emitting diode backlight module.

13. The display calibration method according to claim 12, further comprising:
reducing the size of the central display area when a brightness of the light-emitting diode backlight module is less than a specified brightness to increase the illuminating e of the light-emitting diode backlight module.

14. The display calibration method according to claim 10, further comprising:
increasing a driving current of the light-emitting diode backlight module when a brightness of the light-emitting diode backlight module is less than a specified brightness.

15. The display calibration method according to claim 10, wherein the light-emitting diode backlight module is a local dimming backlight module, wherein
the step of determining at least one illuminating time of the light-emitting diode backlight module comprises:
individually determining an illuminating time of a corresponding one in a plurality of light emitting blocks of the light-emitting diode backlight module according to the response time of the liquid crystal display panel and a plurality of writing periods of a plurality of target display areas of the liquid crystal display panel.

16. The display calibration method according to claim 10, further comprising:
enabling the response time of the liquid crystal display panel to be less than a screen period by an overdrive technology.

\* \* \* \* \*